Aug. 5, 1969     J. W. ALLEN ETAL     3,459,026
APPARATUS FOR FORMING A CELLULAR CORE PANEL
Filed July 28, 1967     5 Sheets-Sheet 3
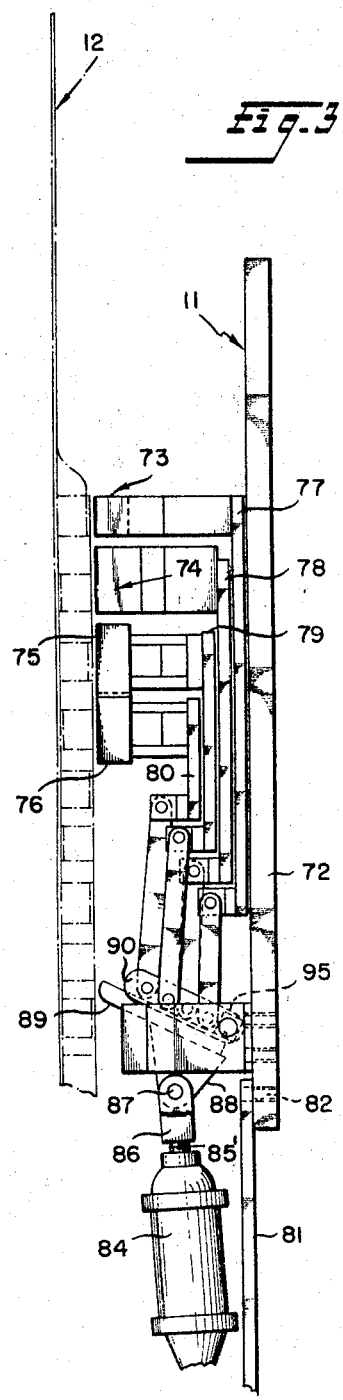
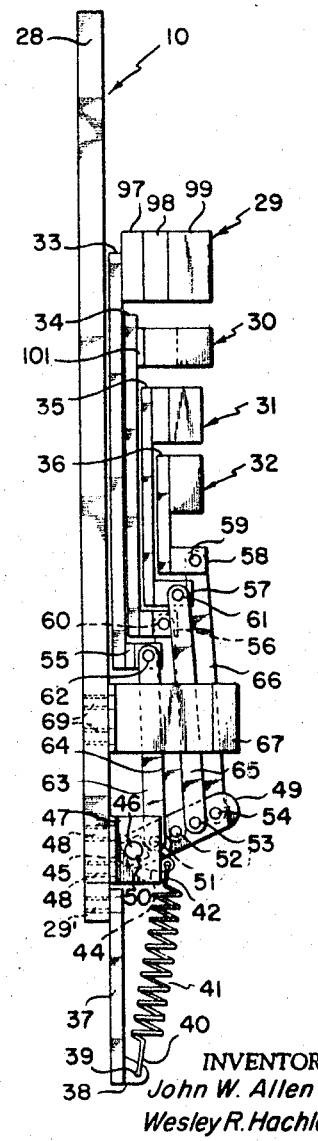
INVENTORS
John W. Allen
Wesley R. Hachler
BY
ATTORNEY

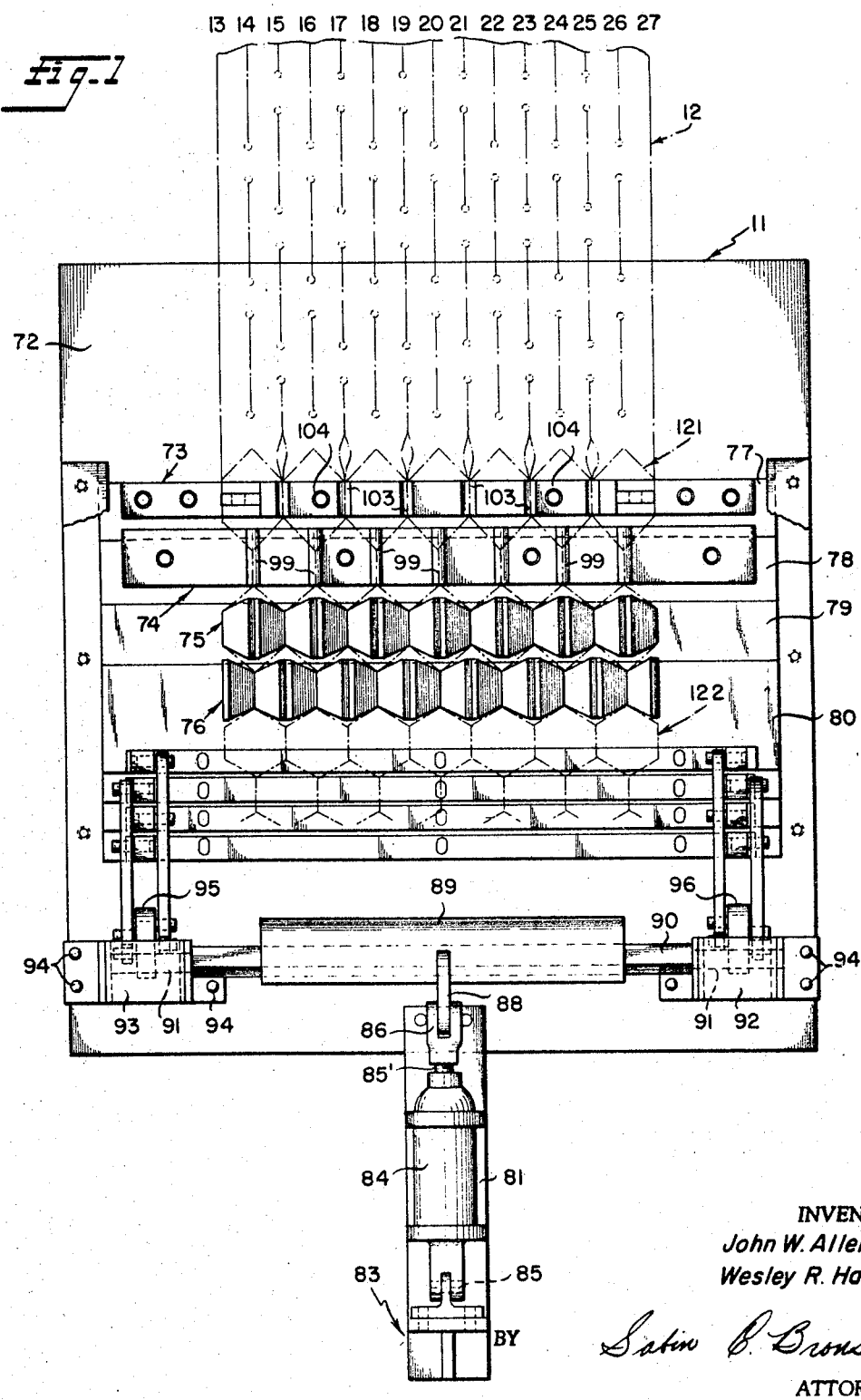

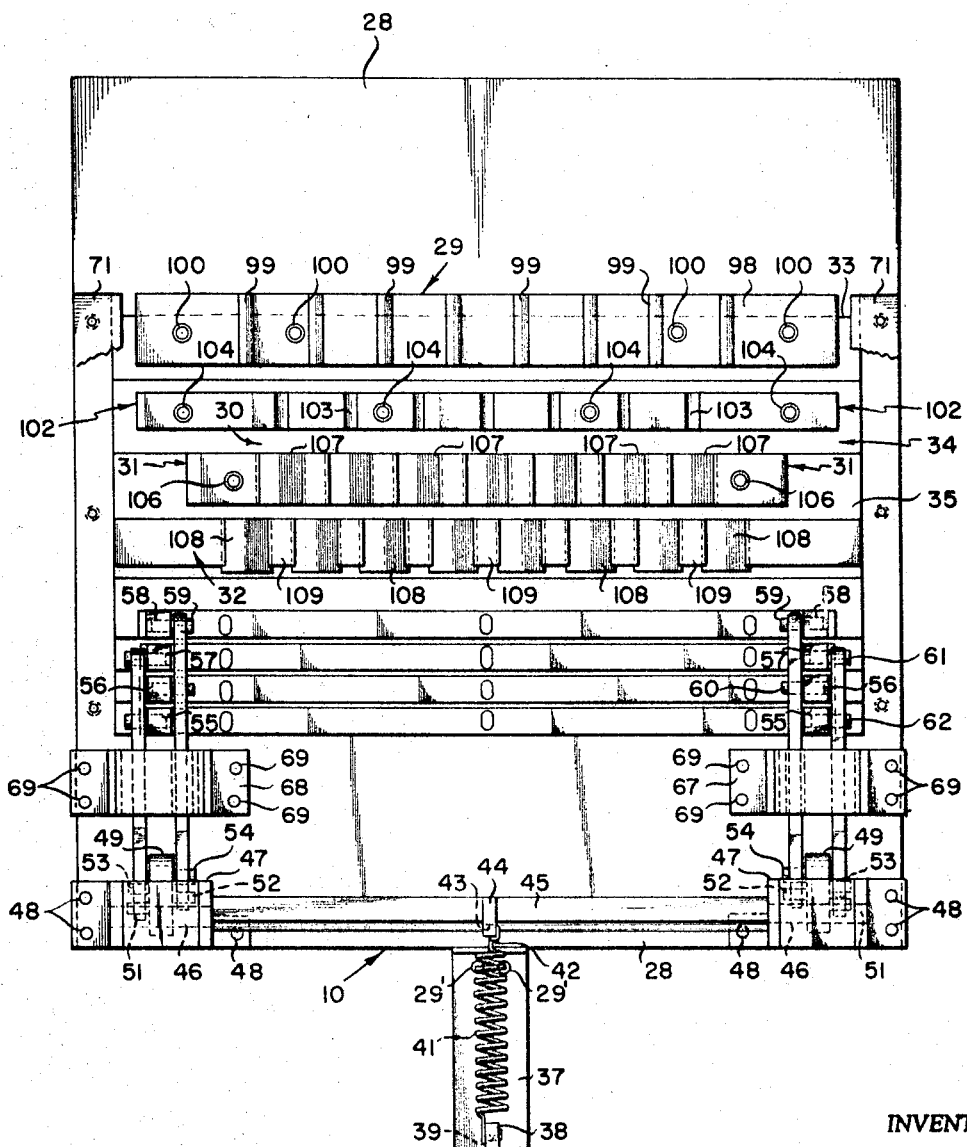

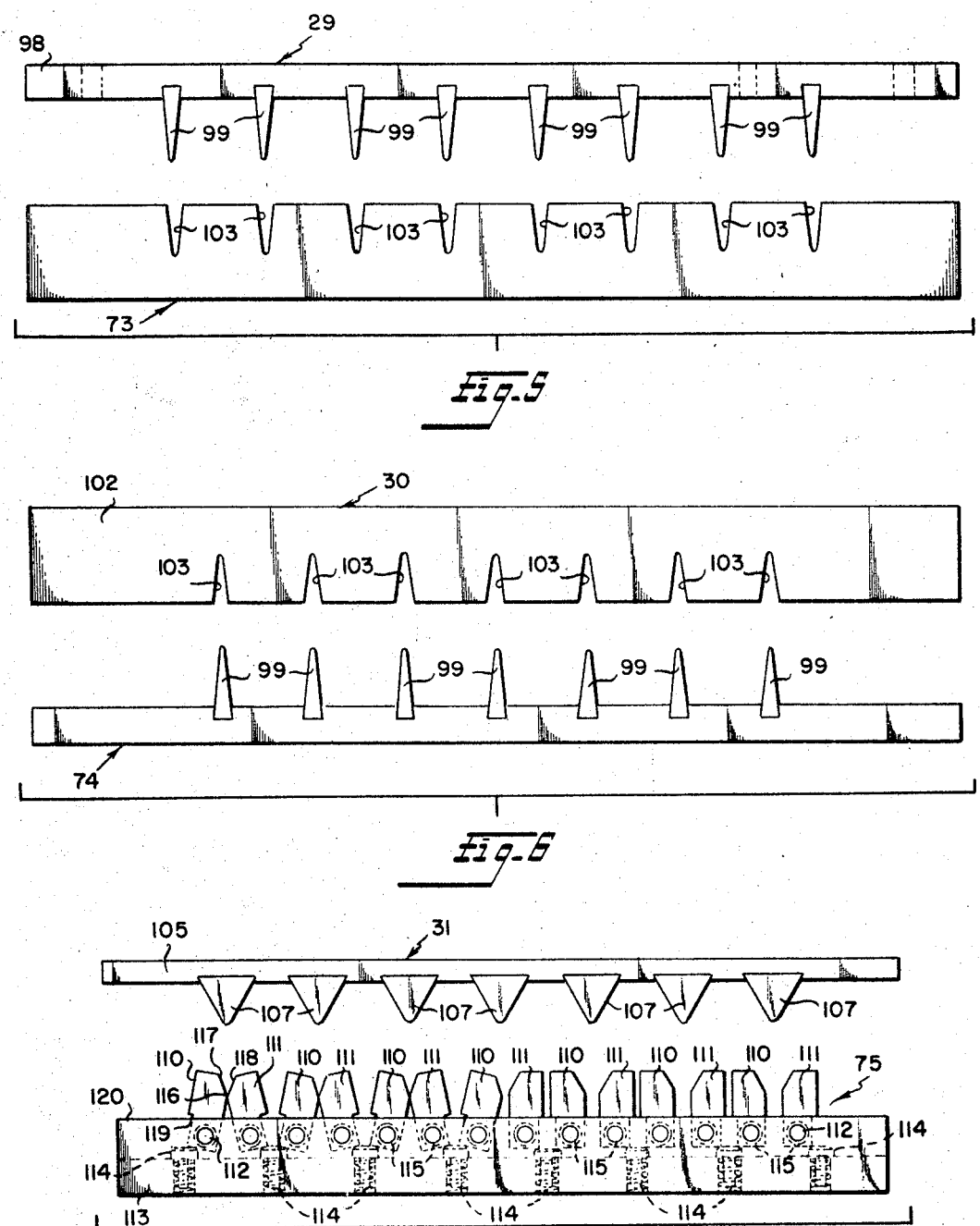

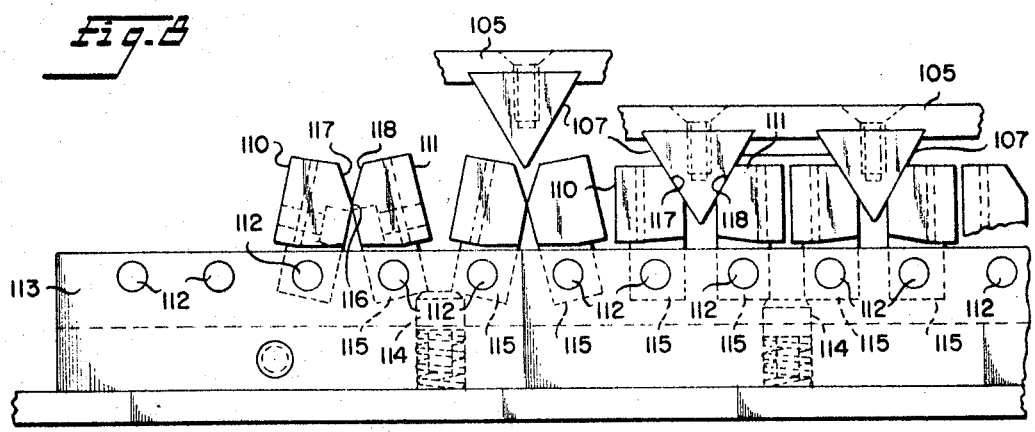
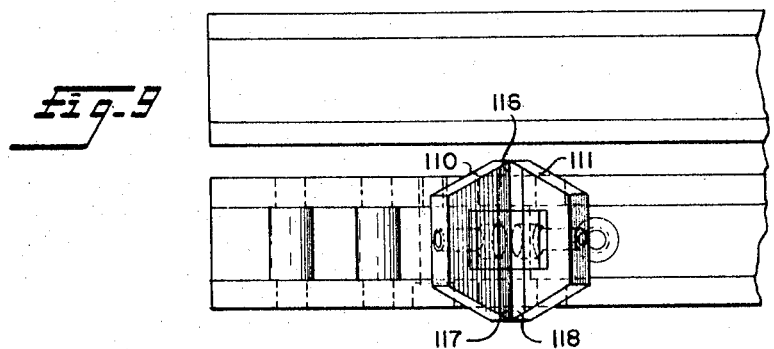
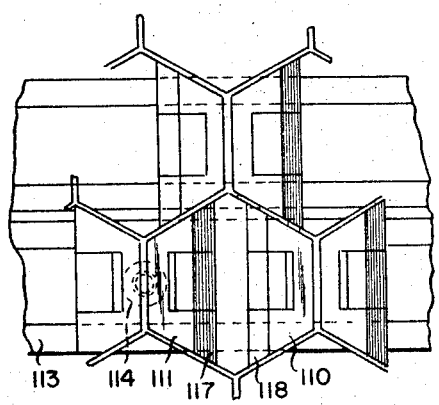

ated press to work on a pre-slit flat metal sheet to form
United States Patent Office 3,459,026
Patented Aug. 5, 1969

3,459,026
APPARATUS FOR FORMING A CELLULAR CORE PANEL
John W. Allen, Flossmoor, Ill., and Wesley R. Hachler, Highland, Ind., assignors to Stanray Corporation, Chicago, Ill., a corporation of Delaware
Filed July 28, 1967, Ser. No. 656,781
Int. Cl. B21d 43/28, 31/02; B21k 27/06
U.S. Cl. 72—324                                     8 Claims

ABSTRACT OF THE DISCLOSURE

A mechanical vertically operated press with top and bottom dies designed to operate progressively in a series of steps on a metal sheet having a plurality of lines of slits so as to form said sheet into an integral cellular core panel. Lines of blades in the dies initially fold the sheet in the unslit portions of each slit line as cooperating lines of punches enter and expand the slits in each line. Lines of wedges in the top die subsequently force the folded and expanded portions of the sheet into lines of squeeze members to complete the folds and to finally form the cells. Cooperating mechanical linkage arrangements on each of the dies interconnect the lines of blades, punches, wedges and squeeze members so that these elements are urged closer together in the direction of the lines of slits during the forming operation.

Background of the invention

The invention relates to the field of metal forming apparatus and more specifically to an arrangement of a set of dies which can be used in a mechanical vertically operated press to work on a pre-slit flat metal sheet to form said flat sheet into an integral cellular core panel.

While the prior art has taught a number of ways in which cellular core panels of the general nature contemplated by this invention can be manufactured, such means have not been entirely satisfactory. For example, it is well known that honeycomb-type cores or cellular core panels can be produced by the use of a plurality of corrugated strips of metal which can be bonded together by means of cements, welding and clamping or other metal securing means. Also, it has been previously known that in making metal grates a metal plate can be slit and bent and then vertically twisted to form hexagonal-shaped walls through a suitable rectifying operation. Unfortunately, these previously used techniques for producing the honeycomb-type core structures have not been completely satisfactory from either a quality or a production standpoint. For example, it has been found that cements may deteriorate and the component parts of the core structure can become separated from one another under conditions of high temperature and high order stresses. Likewise, where a number of structural pieces must be assembled and formed into an integral core through the use of welding or other metal securing techniques, it often occurs that such techniques for securing the individual pieces are not uniform in quality and in certain cases this lack of uniformity can result in a breakdown or deterioration of the core structure. Furthermore, production schedules which involve the assembly of a number of component parts that must be then set up and individually secured together by whatever means necessary, or which involve a number of operations, tend to result in slow schedules and higher costs.

In addition to the above described means, the applicants are aware of reticulating apparatus of the type disclosed in the Hill Patent No. 2,828,792. While the apparatus disclosed in the Hill patent does operate on a pre-slit metal sheet, as does applicants' apparatus, the manner of operation is not satisfactory for producing a true cellular core panel as can be accomplished through the use of applicants' apparatus. The reticulating sheets produced by the Hill apparatus include saddle portions which interconnect the cells but the common plane encompassing the top bend surfaces of the saddles lie below the roughened edges of Hill's side strips between the saddles. Such construction may be desirable for a contemplated use of reticulating sheets such as for gratings, running boards, steps, platforms, etc. However, as a cellular core panel such a construction would not be satisfactory because such a core should have closely spaced contiguous cells with the top bend surfaces of top and bottom connecting portions lying in common planes with the rest of the cell walls so that attached skin sheets will bear equally across the respective surfaces of the core.

The apparatus to be described herein avoids the disadvantages of previously known methods and machines because an integral cellular core panel can be formed by progressively stepping a sheet through a press to produce a panel with the cells disposed at right angles to the original plane of the sheet and with the connecting portions between the cells having bend portions lying in a plane parallel to the original plane of the sheet.

Summary of the invention

In general, the invention involves the use of cooperating top and bottom die arrangements in a mechanical vertically operated press to form a pre-slit metal sheet in two operations as it is stepped through the press. In the first operation a line of blades in one die is disposed in conjunction with a line of punches in the other die, and immediately adjacent thereto in the direction in which the sheet is being progressively moved through the press there is a line of punches in said one die which is disposed in conjunction with a line of blades in the other die.

As the forming operation commerces, the slit sheet is advanced into the press so that the unslit portions of alternate slit lines are aligned beneath the blades in said one die, for example, the top die, and the unslit portions of the remaining slit lines are aligned with the blades in said other die, for example, the bottom die. As thus positioned the punches in the top die are poised above the slits in the alternate slit lines and the punches in the bottom die are directed upwardly toward the slits in the remaining slit lines.

As the press is operated, the top and bottom dies will be forced toward and into the sheet from the top and bottom with the blades in the top die bending the unslit portions in the alternate slit lines downward simultaneously with the upward movement of the punches in the bottom die which expands and opens up material of the sheet around the slits in the alternate slit lines. At the same time the blades in the bottom die will push the unslit portions of the remaining slit lines upward simultaneously with the downward expansion of the slit portions of the remaining slit lines by the punches of the top die.

The net result of this first operation is the formation of a plurality of contiguous cells in one line extending across the original width of the sheet and joined by bent together connecting walls opening downward. There will also be a similar line of contiguous cells disposed adjacent said one line but joined by bent together connecting walls opening upward. It will be understood that these connecting walls will be laterally or transversely offset with respect to said connecting walls in said one line and will also be medially aligned with the cells in said first line. Repeated operation of the dies on the sheet as it is stepped through the press will produce a honeycomb-type core.

The second operation is concerned with more tightly bending the connecting walls between the contiguous cells in each line of cells and with a final forming of each cell. It will be understood that the initial bending as performed in the first operation will result in the walls being bent through a total angle of some 160° so that the connecting walls open either downwardly or upwardly in a slightly opened U configuration. In order to completely close this configuration so that the connecting walls are forced to a tight position normal to the original plane of the sheet, two lines of wedges are positioned beyond the punches and blades in the top die in the direction of movement of the metal sheet through the press. These wedges are associated with cooperating lines of squeeze members in the bottom die so that as the core formed in the first operation is stepped to a second position between said wedges and squeeze members the press operation moves the wedges and squeeze members together and thereby closely flattens the connecting walls and expands the cells to desired shape. It will be appreciated, of course, that these operations are continuous so that each press operation, except the first and last on each sheet, involves the preliminary formation of cells at the same time that previously formed cells are being squeezed into final shape.

An important feature of the invention lies in an arrangement of blades, punches, and wedges with associated squeeze members all carried on movable plates which are actuated through a mechanical linkage system. The arrangement is such that cooperating levers and actuator brackets on the top and bottom dies cooperate to actuate the linkage systems of each die so as to move the various elements of the dies together in the direction of the lines of slits in the sheet as the elements of the die are working on the sheet. This in effect tends to contract the sheet in the direction of the slit lines and is important because if it is not done, cracks and ruptures will tend to develop in the final panel product.

Brief description of the drawings

FIGURE 1 is a plan view of the bottom die looking down on the die;

FIGURE 2 is a plan view of the top die looking up on the die;

FIGURE 3 is a side view of the bottom die of FIGURE 1;

FIGURE 4 is a side view of the top die of FIGURE 2;

FIGURE 5 is a side view showing the relative disposition of the blades in the top die and the punches in the bottom die as the dies are used in a mechanical vertically operated press;

FIGURE 6 is a side view showing the relative disposition of the punches in the top die and the blades in the bottom die as used in the press;

FIGURE 7 is a side view showing one set of wedges in the top die as positioned with regard to a cooperating set of squeeze members in the bottom die as the dies are positioned in the press;

FIGURE 8 is a more detailed front view of a portion of associated lines of wedges and squeeze members both in an open and closed position;

FIGURE 9 is a top plan view of associated sections forming the squeeze members; and FIGURE 10 is a plan view of a portion of the first and second squeeze member lines in the bottom die as completely closed by the wedge lines in the top die to form the cellular core.

Description of the preferred embodiment

The apparatus used for forming the cellular core panel from a pre-slit metal sheet includes a top die arrangement, generally indicated at 10 in FIGURE 2, and a bottom die arrangement, generally indicated at 11 in FIGURE 1, with both dies being suitably mounted in a mechanical vertically operated press. The pre-slit sheet, generally indicated at 12 in FIGURE 1, is disposed to be stepped through the press between the cooperating top and bottom die arrangements. As this invention relates primarily to the arrangement and mode of operation of the dies to work on the pre-slit sheet, it is not thought necessary to describe in detail features of a sheet stepping arrangement or details of a mechanical press. It is sufficient to say that such arrangements are well known in the art and any suitable arrangement of stepping means in cooperation with a vertically operated press may be used.

Before proceeding with a description of the die arrangements and their mode of operation within the press, it is well to discuss the details of the slit sheet 12. As can be seen in FIGURE 1, this sheet includes a number of lines of slits with unslit portions therebetween and these lines extend longitudinally of the sheet 12. For convenience in the later discussion in the manner in which the sheet is positioned to be stepped through the press and the operation of the dies on the sheet, the side edges of the sheet and slit lines are labeled by the numerals 13–27, inclusive, at the break line of the sheet and as reading from left to right in FIGURE 1.

It will be noted that all of the slit lines are parallel to each other and to the side edges of the sheet. In addition, each slit must be of the same length and the centers of the unslit portions tin the slit lines must be at the centers of the slits in the two adjacent slit lines. It is also important to understand that the distance between parallel slit lines must be equal to the desired depth of the cellular core panel to be formed in the apparatus. A further consideration relates to the relative lengths of the slits and the unslit portions in each line. For example, it has been found that if a sheet is so slit that the slit lengths are three times the unslit portions in each line, then the cells as formed in the apparatus will be of a true hexagonal shape formation. However, other proportions of length can be used as desired.

The top die arrangement 10 includes a base plate 28 designed to carry a line of blades, generally indicated at 29, a line of punches, generally indicated at 30, a first line of wedges, generally indicated at 31, and a second line of wedges, offset from said first line of wedges and generally indicated at 32. As best seen in FIGURE 4, these elements are carried on a plurality of overlapping plate members. Thus the line of blades 29 is carried by a plate 33, the line of punches 30 by a plate 34, the first line of wedges 31 by a plate 35, and the second line of wedges 32 by a plate 36. The manner in which the blades, punches and wedges are secured to their respective plates will be described later together with a more specific description of each of the blades, punches and wedges.

It will be noted at this point that plates 33, 34, 35 and 36 are interconnected through a mechanical linkage system which will now be described. At one end of the base plate 28 an extension plate 37 is secured, as by bolts 29', to plate 28. A projection 38 on plate 37 has opening 39 to receive an end wire 40 extending outward from spring 41. The opposite end wire 42 of spring 41 is received in a hole 43 on a lever arm 44 fixed to the square shaft member 45. This shaft member 45 has integral and circular portions 46 rotatably received within identical bearing brackets 47 secured to plate 28 by bolts 48.

Partially disposed within each bearing bracket 47 there is a second lever arm 49 that is secured to its associated end portion 46 by means of a key 50. Longitudinally spaced along the second lever arm 49 are four posts 51, 52, 53 and 54, and as can best be seen in FIGURE 4, adjacent arms project from opposite sides of the arm 49. Referring again to the plates 33, 34, 35 and 36, it can be observed that these plates carry brackets 55, 56, 57 and 58. Brackets 58 and 56 have posts 59 and 60 similar to the posts on the lever arm 49 and projecting to the left as viewed in FIGURE 2. Brackets 57 and 55 carry posts 61 and 62 projecting to the right.

Looking at FIGURE 4, it can be seen that shaft 63 is received between posts 51 and 62; shaft 64 between posts 52 and 60; shaft 65 between posts 53 and 61; and shaft 66 between posts 54 and 59. Actuator brackets 67 and 68 of general box-like shape but with two open sides are secured by bolts 69 to base plate 28 to encompass their respective sets of shafts 63, 64, 65 and 66 to guide and support these shafts. Along the side edges of the base plate 28 there are a pair of identical gibs 71 which have four longitudinally extending grooves that receive the extreme side edges of the plates 33, 34, 35 and 36 to guide and support these plates for movement relative to the base plate 28.

At this point it is believed obvious that as seen in FIGURES 2 and 4 the spring 41 acting through the mechanical linkage system just described will urge the plates 33, 34, 35 and 36 downward, as seen in FIGURE 4. This downward movement is limited to the position shown in FIGURE 4 by contact of the shaft 66 with an inclined groove in the top wall of an associated bracket, such as bracket 67. However, it is also apparent that the plates 33, 34, 35 and 36 can be moved upward as viewed in FIGURE 4 if there is a force acting against the spring force, and this situation will be more fully discussed later.

Turning next to a description of the bottom die arrangement 11 as seen in FIGURES 1 and 3, it can be noted that the general arrangement is somewhat similar to the top die arrangement. Thus a base plate 72 carries a line of punches, generally indicated at 73, and a line of blades, generally indicated at 74. However, instead of wedges the bottom die carries a first line of squeeze members, generally indicated at 75, and a second line of squeeze members, generally indicated at 76. Punch line 73 is mounted on plate 77, blade line 74 on plate 78, the first line of squeeze members 75 on plate 79 and the second line of squeeze members 76 on plate 80.

It will be noted that the plates 77, 78, 79 and 80 are movably connected to a mechanical linkage system like that previously described in detail in conjunction with the top die arrangement. However, the linkage systems do differ to some degree and these differences will now be pointed out. A plate 81 is secured by bolts 82 to the base plate 72 and has an upstanding bracket, generally indicated at 83. One end of a return device 84 is pivotally connected by means of pin 85 to an arm of bracket 83. This return device 84 may be of well-known commercial construction and includes a piston and cylinder arrangement wherein displacement of the piston within the cylinder by an external force compresses the air within the cylinder so that when the force causing the piston displacement is released, the air pressure within the cylinder will return the piston to its original position. Having this basic construction in mind, it will be noted that the piston rod 85' which is connected within the cylinder to a piston, not shown, has a threaded end to receive the clevis 86. Clevis 86 is connected by pin 87 to a lever arm 88. Lever arm 88 in turn is secured to a plate member 89 that is fastened to the square shaft 90 which serves the same function as the shaft 45 in the top die arrangement.

In remaining respects the linkage system of the bottom die 11 is similar to that of the top die, and consequently only a portion will be labeled. Thus, the end circular portions 91 on shaft 90 are rotatably carried in actuator brackets 92 and 93 fixed to base plate 72 by rivets 94. Each circular part 91 is keyed to associated lever arms 95 and 96.

The operation of the mechanical linkage systems on the bottom and top die arrangements can now be explained. Assume that the dies are being moved towards each other by the press operation, and as such operation continues, the die elements commence to work on the slit sheet. When this occurs the top actuator brackets 67 and 68 are pressed against the lever arms 95 and 96, respectively, of the bottom die linkage system. This forces the arms 95 and 96 downward and causes the plates 77, 78, 79 and 80 to move relative to each other in an upward direction as seen in FIGURE 1. Such movement is resisted by the return device 84 in a manner previously explained.

Due to the fact that the shafts connecting the various plates 77, 78, 79 and 80 are pivotally connected at various points along the lengths of the lever arms 95 and 96, it will be appreciated that the various lines of elements carried by such plates will be moved relative to each other in varying amounts depending on the shaft position on the lever. For example, in an arrangement successfully used, the distance between the center of the punch line 73 and blade line 74 is 3" at the start of the operation. The distance between center lines of blade line 74 and the first squeeze member line 75 is 2⅝", and the distance between center lines of the first squeeze member line 75 and the second squeeze member line 76 is also 2⅝". At the end of the press stroke these distances are 2⅝", 2¼" and 2¼", respectively.

Simultaneous with the linkage actuation on the bottom die 11, as explained above, the bottom die actuator brackets 92 and 93 will be acting on lever arms 49, 49 of the top die linkage system. This causes the move of shafts 63, 64, 65 and 66 and the upward movement of associated plates 33, 34, 35 and 36 as viewed in FIGURE 4. Such movement is resisted by the spring 41 and the movement is in the same amount as that in the bottom die linkage system.

As the dies are retracted in the press operation, return device 84 and spring 41 act to return the respective linkage systems to positions as seen in FIGURES 3 and 4 where they are ready for the next work stroke of the press. At this point it can be pointed out that the plate 89 on shaft 90 functions to slightly lift the finished portion of the core out from between the dies as this plate is pulled up and back under the influence of the return device 84.

Turning next to a description of the various blade, punch, wedge and squeeze members and the manner of their attachment to associated movable plates, attention is now directed first to FIGURES 2, 4 and 5. Looking at the blade line 29, a liner 97 is positioned on plate 33. The blade line, or male die, is seen in FIGURE 5 and has a base plate 98 carrying a plurality of blades 99, and in the case of the top die there are eight blades. Base plate 98 and liner 97 are secured to plate 33 by means of cap screws 100.

In punch line 30 a filler member 101 is positioned on plate 34 to support the punch line, or female die, as seen in FIGURE 6. This die has a base section 102 with a plurality of indentations 103, and in the case of the top die there are seven such indentations. Cap screws 104 extend through the base section 102 and filler member 101 to secure the unit to the plate 34.

Turning for the moment to FIGURES 1 and 3, it can be seen that the corresponding blade and punch lines, or male and female dies 74 and 73, respectively, are secured to their associated plates 78 and 77 in a similar manner. The male and female die of the bottom die arrangement are similar in design to those of the top die arrangement and differ only in the fact that the bottom male die has seven blades and the bottom female die has eight indentations.

Again referring to FIGURES 2 and 4, the first and second wedge lines 31 and 32 can now be described in conjunction with FIGURE 7. The first wedge line includes a die plate 105 adapted to be secured by screws 106 to the plate 35 and to receive seven individual wedges 107 that can be secured to the die plate so as to position them in spaced relationship as seen in FIGURE 7. The second wedge line 32 has eight wedges 108 secured directly to plate 36 and with spacing members 109 therebetween.

It will be recalled that the first and second wedge lines in the top die cooperate with squeeze members in lines 75 and 76 in the bottom die as seen in FIGURE 1. As shown in FIGURE 7, each squeeze member consists of two sections 110 and 111 that are pivotally mounted by pins 112 in a base 113. In FIGURE 7 the equeeze members to the left of the medial line are shown in open position or a position where the wedges have not been forced into engagement with them. It will be noted that these members are retained in this open position by means of a plurality of spring loaded pistons 114 in base 113 and these pistons bear against the bottom surfaces 115 of the sections 110 and 111.

As seen best in FIGURE 9, sections 110 and 111 are of a shape of one-half of a hexagonal post. When in open position, as seen at the left of FIGURES 7 and 8, the inner walls meet at a line 116 and the walls 117 and 118 of sections 110 and 111, respectively, diverge upwardly. Note that each section has a ledge or lip 119 which is designed to contact the top surface 120 of base 113 and thereby prevent the sections 110 and 111 from being tilted beyond an upright position as the sections are moved by action of the wedges.

As the wedge members 107 enter between sections 110 and 111 along the walls 117 and 118, as best seen in FIGURE 8, sctions 110 and 111 are spread apart to form, with an adjacent section, a complete hexagonal-shaped post as seen in FIGURE 10.

The specific operation of the top die arrangement 10 and bottom die arrangement 11 on the slit sheet 12 as governed by the working and retracting strokes of the mechanical vertically operated press will now be described. As seen in FIGURE 1, the slit sheet 12 is accurately positioned so that side edges 13 and 27 and slit lines 15, 17, 19, 21, 23 and 25 will be worked on by the male die of line 29 in the top die arrangement and by the cooperating female die of line 73 in the bottom die arrangement. Likewise, the slit lines 14, 16, 18, 20, 22, 24 and 26 will be worked on by the male die of line 74 in the bottom die arrangement and its cooperating female die in the line 30 of the tope die arrangement.

Assume now that the slit sheet is aligned with the die arrangements, as above described, then the first step involves the movement of the leading edge of the sheet to a position within the die arrangements by means of the particular stepping means which is associated with the press. This first stepping operation is such that the sheet edges 13 and 27 and the unslit portions of slit lines 15, 17, 19, 21, 23 and 25 will lie between the blades 99 in the male die line 29 and the indentations 103 in the female die line 73. From this it follows that the punch portions of the female die line 73 are medially positioned on the slits in slit lines 14, 16, 18, 20, 22, 24 and 26. Likewise, the blades 99 of the male die line 74 and indentations 103 in its corresponding female die line 30 are aligned on the unslit portions of slit lines 14, 16, 18, 20, 22, 24 and 26 and the punch portions of the female die line 30 will be medially aligned with the slits in lines 15, 17, 19, 21, 23 and 25.

As the press is operated in its first work stroke, the top and bottom die arrangements 10 and 11 will be forced together to operate on the slit sheet. Cooperating blades and indentations in the lines of the male and female dies will fold the unslit portions of its associated slit lines in a U-shaped bend, as previously explained, and the punches of the female dies will expand and open up the slits in the slit lines. As an aid to visualizing this first operation, attention is directed to FIGURE 1 wherein the form of the elongated cells as produced in this operation is shown in dashed lines and generally designated by the reference numeral 121.

It is conceivable that the mechanical linkage system for interconnecting plates 33, 34, 35 and 36 and 77, 78, 79 and 80 of the die arrangements, could be by means of cams, air or hydraulic cylinders, or allowing one of the die arrangements to freely float against a return spring so that the die arrangement could move as required by the sheet being worked upon and returned by the spring after each work stroke.

After this first operation the press is operated to retract the die arrangements from the core as formed by this first operation and the stepping mechanism then operates to move the two lines of the core between the two lines of wedges and squeeze members. As this occurs, an unworked section of the slit sheet is also advanced to a position between the two lines of cooperating male and female dies as previously described in detail above.

The press is now operated again in another work stroke and the male and female dies form the slit sheet as in the first operation, while at the same time the wedges and cooperating squeeze members are working on the core section already formed from the sheet. The latter operation involves tightly squeezing the connecting walls between the cells into a tight fold whereby the walls are parallel to each other and are disposed normal to the original plane of the sheet. At the same time the squeeze members on expansion have expanded the elongated cells 121 to cells of hexagonal shape as seen in dashed lines in FIGURE 1, and generally designated by the reference numeral 122. The press is then operated again to retract the die arrangements from the finally and partially completed core sections and the slit sheet is then advanced for further cycles of operations.

It will be remembered that during both the first and subsequent operations on the slit sheet and the elongated cells, the mechanical linkage arrangements will operate during each work stroke of the press to slightly gather the material of the sheet in the direction of the slit lines so as to relieve forming stresses.

From the foregoing it is evident that we have devised an improved apparatus for transforming a flat sheet of metal into an integral cellular core member, and the above description of the invention taken with the accompanying drawings is believed to be amply sufficient for one skilled in this art to make and perform the invention.

We claim:

1. Apparatus for forming a cellular core panel from a sheet of deformable material having a plurality of lines of slits parallel to each other and to the side edges of the sheet, including a mechanical vertically operated press with upper and lower jaw members, two lines of associated blades and punches carried by said upper and lower jaw members, means associated with said press for progressively stepping said sheet between said lines of blades and punches before each work stroke of said press, said means positioning the unslit portions of each slit line in the path of the work stroke of the blades, and the slit portions in each slit line in the path of the work stroke of the punches, said punches, during the work stroke, deforming the material on opposite sides of the slits into side walls of a plurality of contiguous cells, said side walls disposed substantially normal to the original plane of the sheet, said blades, during the work stroke, bending the unslit portions connecting the cells so as to lie approximately normal to the original plane of the sheet, mechanical linkage means carrying the adjacent lines of punches and blades on each of the jaws, cooperating actuating means connected with said linkage means, whereby as the jaws approach each other during a work stroke the mechanical linkage means will act to move the adjacent lines of punches and blades toward each other and thereby gather the sheet material in the direction of the slit lines during each work stroke of the press.

2. Apparatus for forming a cellular core panel from a sheet of deformable material having a plurality of lines of spaced slits disposed parallel to each other and to the side edges of the sheet and extending longitudinally of the sheet, including top and bottom die arrangements on the jaws of a mechanical vertically operated press, means for progressively stepping said sheet between said die arrangements between work strokes of the press, overlapping plate means on each die arrangement for separately carrying a male die line with projecting blades adjacent to a female die line with spaced rectangular punches, the male die on each die arrangement being disposed to operate with the female die in the opposite die arrangement, mechanical linkage means for moving the plates on each die arrangement toward each other along the length of the slit lines in said sheet, means associated with each linkage system to actuate said mechanical linkage means upon contact with an opposite die arrangement as said die arrangements approach each other during a work stroke, said lines of cooperating male and female dies simultaneously bending the unslit portions of said slit lines to a position approximately normal to the original plane of the sheet at the same time the punches are expanding the slit portions of the slit lines into a plurality of elongated contiguous cells having side walls lying approximately normal to the original plane of the sheet and being connected by said bent portions of the sheet, said linkage means operating through said dies to slightly gather the sheet material in the direction of the slit lines during each metal forming operation.

3. Apparatus for forming a cellular core panel from a sheet of deformable material having a plurality of spaced lines of slits disposed parallel to each other and the side edges of the sheet and extending longitudinally of the sheet, including, two lines of associated blade and punch means carried by upper and lower jaws of a mechanical vertically operated press, stepping means associated with said press to position said sheet between said lines of blades and punches before each work stroke of the press, said stepping means positioning the unslit portions of each slit line within the path of the work stroke of the blades while the slits in each line are positioned within the path of the work stroke of the punches, said punches expanding the slit portions of said sheet into a plurality of contiguous elongated cells having side walls disposed approximately normal to the original plane of the sheet, said blades bending the unslit portions of said sheet connecting the cells into wall portions lying approximately normal to said original plane of said sheet, mechanical linkage means carrying the adjacent lines of punches and blades on each of the jaws, cooperating actuating means for said linkage means whereby as said jaws approach each other during a work stroke the mechanical linkage will act to move said adjacent lines of punches and blades on each jaw toward each other and thereby slightly gather the sheet material in the direction of the slit line during each forming operation.

4. Apparatus as in claim 3, wherein said upper jaw carries a plurality of lines of wedges extending across the width of said sheet and positioned beyond said punch and blade lines in a direction of the sheet movement, a plurality of lines of squeeze members in said lower jaw associated with said lines of wedges, the elongated cells and connecting walls as formed by the blade and punch lines being next advanced by the stepping means to a position between said wedges and squeeze members, whereby each stroke of the press will complete the bend of the wall portions to a position normal to the original plane of the sheet and will reduce the overall length of each of the elongated cells.

5. Apparatus as in claim 4 wherein the lines of wedges and the lines of squeeze members are carried as part of the mechanical linkage system on each jaw which causes a metal gathering in the direction of said slit lines during this additional metal forming operation.

6. Apparatus as in claim 4 wherein said squeeze members comprise pairs of movable half sections that are spread apart by said wedges to form complete sections of a hexagonal shape, said elongated cells being received about said pairs of half sections before being spread by said wedges and said cells being formed to hexagonal shape as the sections are spread to the complete sections, the connecting wall portions between cells being simultaneously flattened together between slightly spaced cooperating walls in the complete sections.

7. Apparatus for forming a cellular core panel from a metal sheet haivng a series of parallel slit lines equally spaced from each other and the side edges of the sheet, including a mechanical vertically operated press with upper and lower jaw members, a top die arrangement carried on said upper jaw member and bottom die arrangement carried on said lower jaw member, means associated with said press for stepping said sheet between said top and bottom die arrangements between working strokes of said press, said top die arrangement having a male die with a plurality of blade members transversely spaced across the width of said sheet, said male die being associated in a first line with a female die in said bottom die arrangement having a plurality of spaced rectangular-shaped punch portions, a second line of blades and associated punches carried by said jaws but reversed in posi- between said upper and lower jaws, said second line of blades and punches being positioned adjacent to but forwardly of the first line of blades and punches in a direction in which the sheet is being stepped, the male and female dies in each die arrangement being mounted on separate plates for movement relative to each other in the direction of the sheet movement in the press, mechanical linkage means on each die arrangement for moving said plates, said linkage being actuated by lever means which contact the opposite die arrangement as the two die arrangements form the sheet, the blades in the top die arrangement being aligned with every other slit line and the blades in said bottom die arrangement being aligned with the remaining every other slit line in said sheet, said stepping means being set to position only the unslit portions of each slit line within the range of work strokes of said blades, said work stroke of the two lines of blades being effective to bend the sheet material transversely adjacent said unslit portions into parallel connecting walls that connect the cells formed by the respective punch portions of both the top and bottom die arrangements entering and expanding the slit portions of all of the slit lines.

8. Apparatus for forming a cellular core panel from a sheet of deformable material having a plurality of lines of slits parallel to each other and to the side edges of the sheet, including a reciprocating press with upper and lower jaw members carrying upper and lower die arrangements, two lines of associated blades and punches carried by said upper and lower jaw members, means associated with said press for progressively stepping said sheet between said lines of blades and punches before each work stroke of said press, said means positioning the unslit portions of each slit line in the path of the work stroke of the blades, and the slit portions in each slit line in the path of the work stroke of the punches, said punches, during the work stroke, deforming the material on opposite sides of the slits into side walls of a plurality of contiguous cells, said side walls disposed substantially normal to the original plane of the sheet, said blades, during the work stroke, bending the unslit portions connecting the cells so as to lie approximately normal to the original plane of the sheet, means carrying the associated lines of punches and blades on each of the jaws, cooperating actuating means connected with said punch and blade carrying means, whereby as the jaws approach each other during a work stroke the adjacent lines of punches and blades will be moved toward each other and thereby gather the sheet material in the direction of the slit lines during each work stroke of the press.

References Cited

UNITED STATES PATENTS

| | | | |
|---|---|---|---|
| 1,797,506 | 3/1931 | Kessler | 29—6.1 |
| 2,322,204 | 6/1943 | Ballard | 29—6.2 |
| 2,828,843 | 4/1958 | Hill | 52—180 |
| 3,035,952 | 5/1962 | Gwynne | 29—455 |
| 3,216,083 | 11/1965 | Acker | 29—6.2 |

CHARLES W. LANHAM, Primary Examiner

E. M. COMBS, Assistant Examiner

U.S. Cl. X.R.

29—6, 163, 455